(No Model.) 4 Sheets—Sheet 3.
A. GIPPERICH.
APPARATUS FOR DETERMINING THE VALUE OF ELECTRO MAGNETIC FORCES BY WEIGHT
No. 400,663. Patented Apr. 2, 1889.
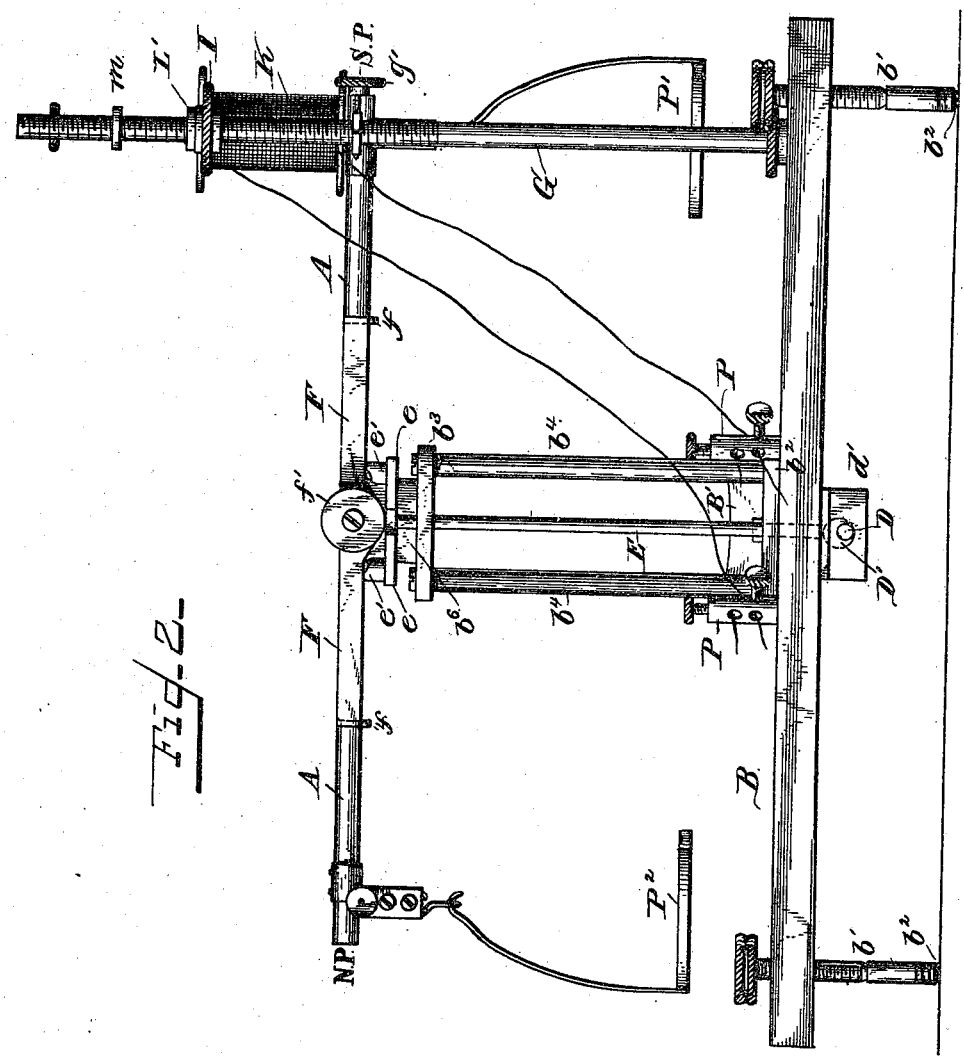

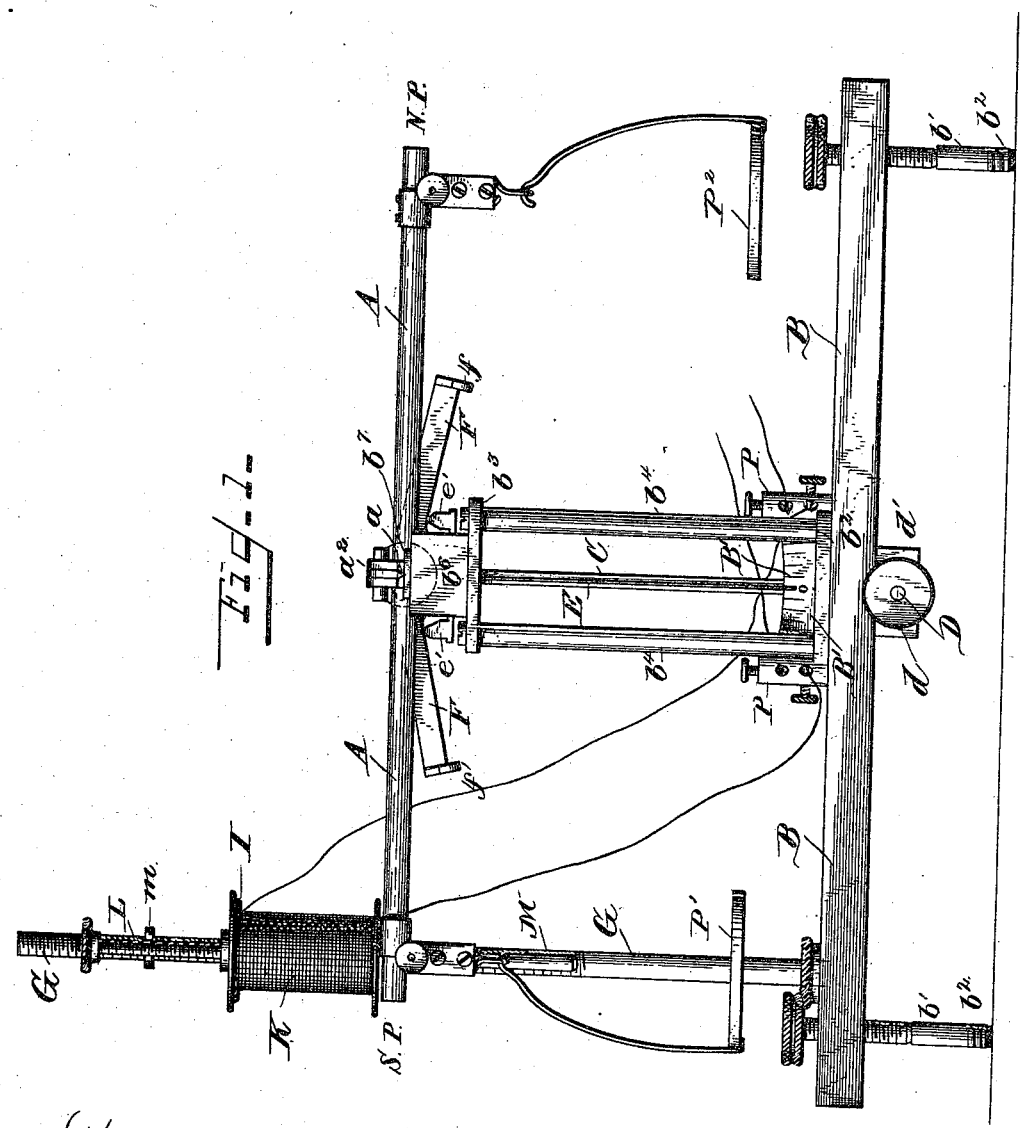

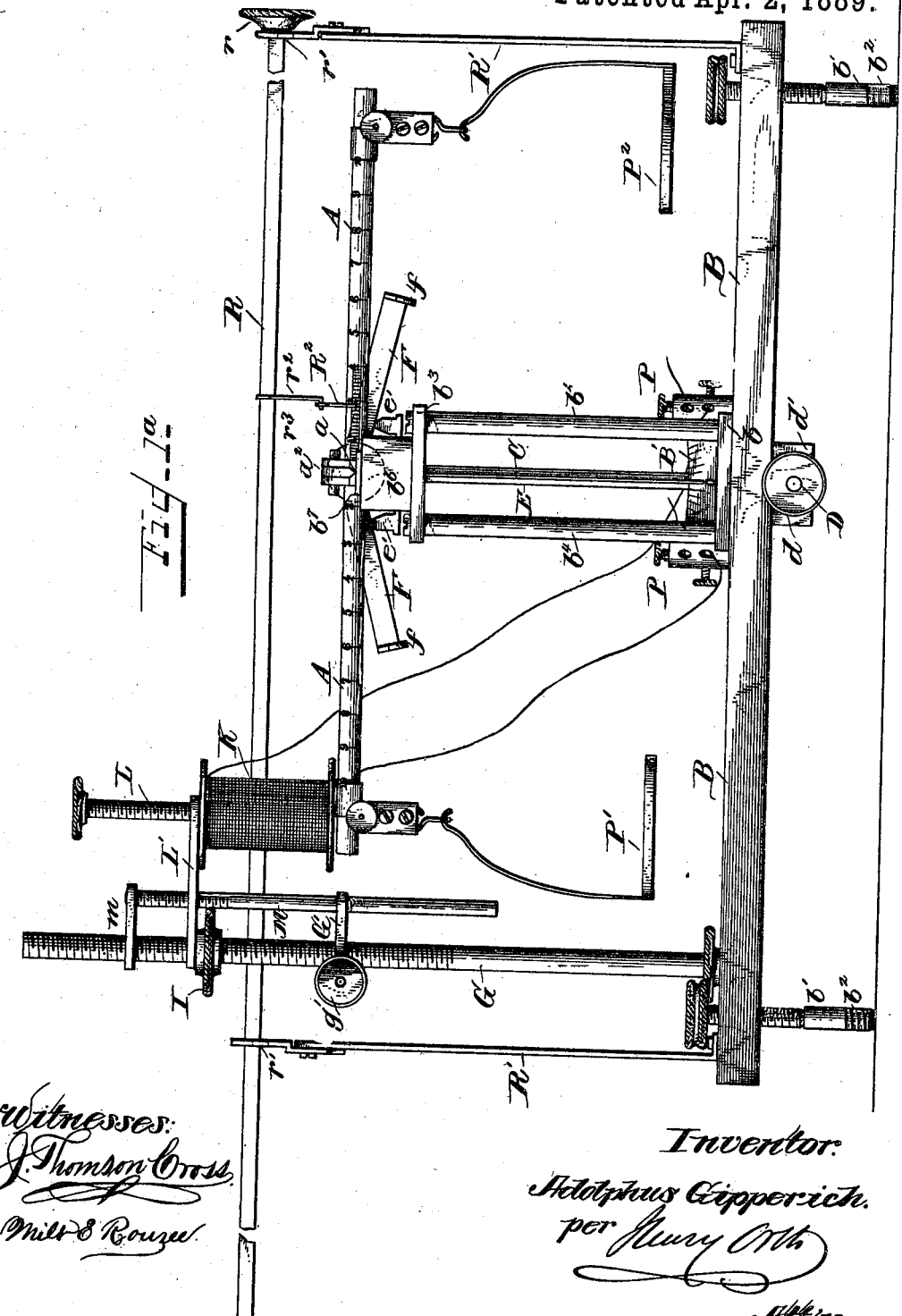

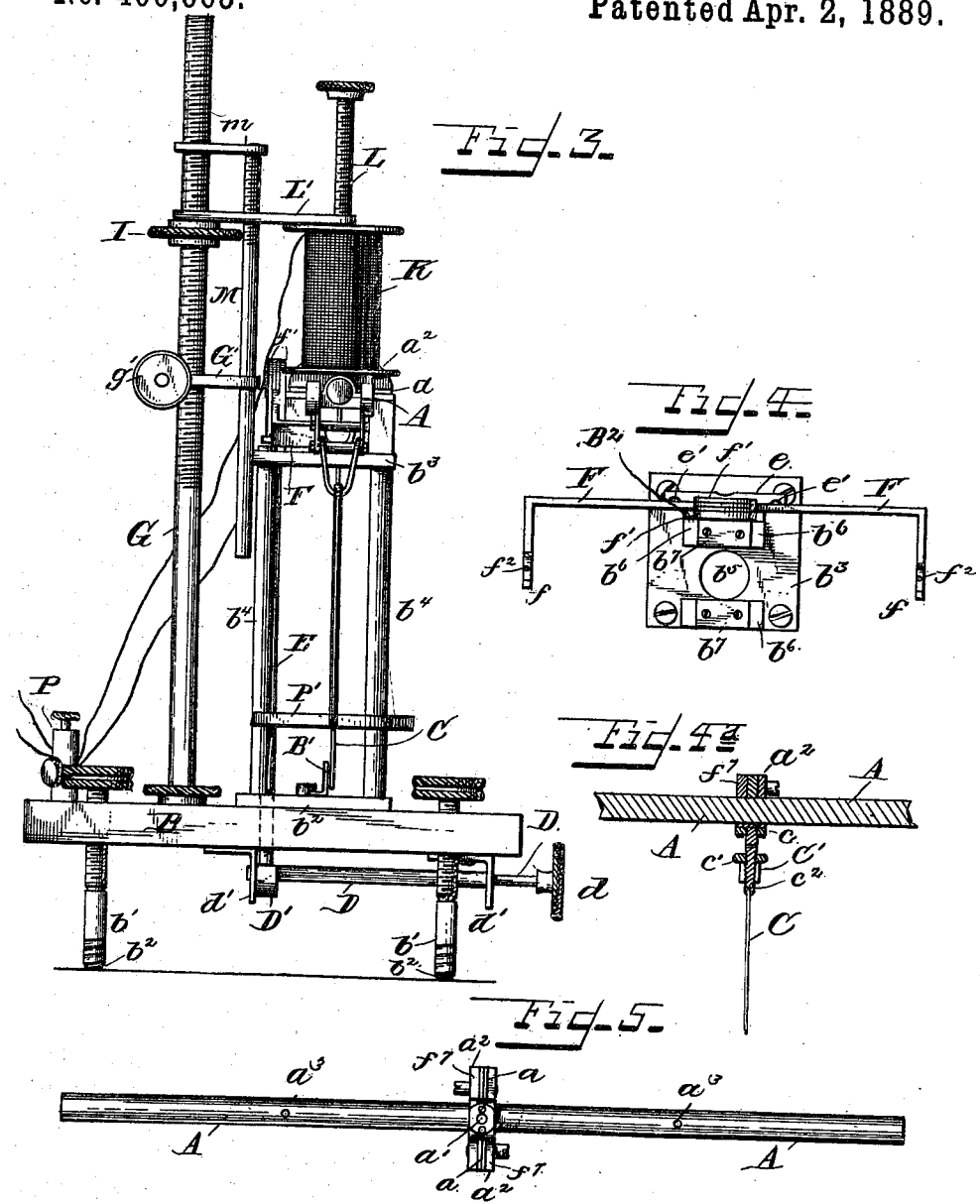

UNITED STATES PATENT OFFICE.

ADOLPHUS GIPPERICH, OF RICHMOND, VIRGINIA.

APPARATUS FOR DETERMINING THE VALUE OF ELECTRO-MAGNETIC FORCES BY WEIGHT.

SPECIFICATION forming part of Letters Patent No. 400,663, dated April 2, 1889.

Application filed October 2, 1888. Serial No. 287,033. (No model.)

*To all whom it may concern:*

Be it known that I, ADOLPHUS GIPPERICH, a citizen of the United States, residing at Richmond, in the county of Henrico and State of Virginia, have invented certain new and useful Improvements in Apparatus for Determining the Value of Electro-Magnetic Forces by Weight; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Referring to the drawings, Figures 1 and 2 are front and rear elevations of a scale for weighing magnetic, electric, or electro-magnetic forces embodying my invention; and Fig. 1$^a$ is a front elevation showing the combination of a rider-bar with the scale-beam. Fig. 3 is an end elevation thereof. Fig. 4 is a top plan view of the support for the scale-beam, and Fig. 4$^a$ is a detail view. Fig. 5 is an under side view of the scale-beam.

The invention relates to scales for weighing magnetic, electric, or electro-magnetic forces; and it consists in a magnetized or polarized scale-beam, in combination with a suitable support therefor; in a magnetized or polarized scale-beam neutralized or counterpoised as against the influence of terrestrial magnetism in combination with a suitable support therefor; in the combination, with the polarized or magnetized scale-beam, of a holder for the conductor for the magnetic, electric, or electro-magnetic force to be weighed. The invention, finally, consists in certain structural features and combinations of parts, substantially as hereinafter fully described, and as set forth in the claims.

My improved scales for weighing magnetic, electric, or electro-magnetic forces comprises, essentially, a scale-beam, A, which consists of a magnetized or polarized bar, preferably cylindrical in cross-section, supported by knife-edges $a$ from a suitable support. This support comprises a base, B, provided with leveling-screws $b'$, that are preferably faced with a piece of rubber, $b^2$, to prevent slipping on the table that supports the instrument, and of a standard consisting, preferably, of a base and top plate, $b^2$ $b^3$, respectively, connected by four supporting-rods, $b^4$. The top plate, $b^3$, has an opening or slot, $b^5$, Fig. 4, for the passage and vibration of the tongue C of the scale-beam A, and to the lower plate, $b^2$, is secured a graduated index, B', to indicate any deflection of the tongue C from the zero-mark.

To the upper plate, $b^3$, of the standard are secured two blocks, $b^6$, on opposite sides of the opening $b^5$ in said plate, to which blocks $b^6$ are secured two steel plates, $b^7$, that serve as bearings for the steel knife-edges $a$ of the beam A.

It is obvious that the friction between the knife-edges and their bearings is reduced to a minimum by allowing such edges to bear upon a perfectly plane, hard, and polished surface, as is the case in the construction described.

To provide means for adjusting the tongue to perfectly equilibrate the scale-beam, said tongue is secured to a stock or holder, $c$, that is screw-threaded exteriorly for the purpose of screwing it into a screw-threaded socket, $a'$, Fig. 5, formed in the knife-edge bearings $a^2$, and a screw-threaded portion, $c^2$, on which works a split sleeve, C', that has a milled head, $c'$, said split sleeve being of considerable weight and performing the function of an adjustable counterpoise to hold the scale-beam in equilibrium by a minimum gravital force in the plane of the true center of gravity of the knife-edges.

D is a shaft mounted in bearings $d'$, secured to the under side of the base B, and said shaft carries at one end (which projects sufficiently beyond the base for manipulation) a milled head, $d$, and at its opposite end said shaft carries an eccentric, D'. (Shown in dotted lines in Fig. 2 and in full lines in Fig. 3.) Upon the eccentric D' rests the lower end of a lifting-rod, E, to the upper end of which is secured a cross-head, $e$, from the opposite ends of which project bearing-lugs $e'$, upon which rest the lifting-arms F, that serve to lift the scale-beam out of contact with its bearings when not in use. These lifting-arms F are pivoted between bearing-plates $f'$, secured to the rear block, B$^2$, of the knife-edge bearings $b^7$ for the scale-beam.

In order to accurately lift the scale-beam and to prevent its displacement longitudinally, the bearings $f'$ of the lifting-arms F are provided with a lug or pin, $f^2$, the beam A being provided with holes or sockets $a'$, Figs. 4 and 5, so that unless the beam is correctly placed with its knife-edges on the bearing-plates $b^7$ exactly in the axial plane of the pivot-pin of the lifting-arms the pins $f^2$ will not register with the sockets $a^3$. At the south-pole end of the beam A is a standard, G, secured to the base B, said standard being screw-threaded for the greater portion of its length.

Upon the standard is secured a bracket-arm that is adjustable vertically, said bracket-arm being partly split, so as to act as a clamp, and is clamped upon the standard by means of a screw, $g'$, working in said split portion.

A nut, I, works on the threaded portion of the standard G and serves to adjust or position a spool of insulated wire, K, (or other electric conductor,) secured to a rod, L, screwed into a bracket-arm, L', mounted loosely on the standard G and firmly supported and guided on said standard by a guide rod and bracket, M $m$; and P P are binding-posts for connecting the spool-wire ends with a source of electricity.

P' and P² are the scale-pans suspended from the scale-beam at the centers of attraction or points of leverage previously determined, as described in my application for patent hereinafter referred to.

In practice I combine with the scale-beam a rider-bar, R, supported by brackets $r'$ on standards R', said bar moving freely in the brackets and carrying a milled head, $r$, and a finger or holder, $r^2$, from which the rider R² is suspended when not in use.

The two limbs of the scale-beams may be graduated to any desired weight. In the example given each limb is divided into ten equal parts from the fulcrum or knife-edges to the point of suspension of the scale-pans or center of attraction, and each of these divisions is again subdivided into ten equal parts, each limb having one hundred subdivisions.

The rider is supposed to weigh ten milligrams, and will counterbalance this weight in the scale-pan P' when placed at the outer graduation, 10, on the north-pole limb of the beam, the subdivisions corresponding, therefore, to one-tenth of a milligram.

The bracket-supports $r'$ for the rider-bar are so arranged relatively to the scale-beam that the suspension-finger $r^2$ will be on a line with the eye $r^3$ of the rider R² when the beam is lifted off its bearings, so that the finger may engage the eye of the rider and support it clear of the beam when the latter is lowered to its bearings. Thus when it is desired to use the rider, the scale-beam is lifted and the rider-bar manipulated to bring the rider to any of the subdivisions on the beam, the finger is then withdrawn from the eye of the rider, and the beam lowered to its bearings.

Any other arrangement may, however, be used to manipulate or position the rider.

The operation of the scales may be briefly described as follows: The spool is adjusted with its axis over the south pole of the scale-beam—the north pole down and the south pole up—and is connected with the corresponding poles of the electrical source. A current of electricity passing through the wire on spool K will attract the south pole of the scale-beam, weights being placed in the scale-pan P' until the beam is held in equilibrium on its knife-edges, the weight or weights indicating the value of the electric current. In a similar manner other magnetic, electric, or electro-magnetic forces may be weighed.

I am aware that it is not new to weigh electrical forces; but the results in all instruments heretofore used are necessarily erroneous, and for various reasons: first, because of the absence of a unit standard of weight; secondly, because a very important factor, terrestrial magnetism, which heretofore had to be ignored for the simple reason that no means were provided to take such magnetism into account; thirdly, because of the use of a non-magnetized or non-polarized scale-beam, whereby an accurate weighing could not possibly be obtained, even setting aside the potent factor of terrestrial magnetism, as such scale-beam after being subjected for a time to the influence of magnetic, electric, or electro-magnetic forces must necessarily become more or less magnetized, thus being more readily attracted or repelled by the forces to be weighed, and, finally, when such a beam becomes more or less charged with magnetism the weighing must necessarily be erroneous unless the center of attraction is first ascertained, so that the weight and electro-magnetic forces will act upon levers of equal length.

In an application for Letters Patent filed September, 1888, Serial No. 286,372, I have not only described the mode of preparing the magnetized or polarized scale-beams, but I have also pointed out the mode of finding what I call the "center of attraction"—that is to say, that precise point which constitutes the pivotal point of the lever of force, so that the forces on opposite sides thereof counterbalance each other; and as this is the case at each pole, a perfectly-balanced scale-beam is obtained. In the said application I have also fully pointed out the mode of neutralizing or counterbalancing the scale-beam as against terrestrial magnetism and the mode of accurately ascertaining the value of such, thus providing a tangible "unit of weight," if I may so call it, with which all other magnetic, electric, or electro-magnetic forces may be compared. Finally, I have fully set forth the mode of standardizing the scale-beams, so that the scales may be used in any locality. It is therefore not necessary to again describe these methods here in detail, and it will be sufficient to state that the scale-beam is in the instrument under consideration a polarized one, and that it is or may be readily neutralized as against terrestrial magnetism on a line east and west, in which plane the scale-beam should lie, by placing sufficient weight in the scale-pan on the south pole to bring the beam into perfect equilibrium, this weight being the value of terrestrial magnetism in the locality where the scales are used. Of course it will be understood that this arrangement is reversed for scales used south of the magnetic equator.

As the center of attraction or the point of leverage of the forces is accurately determined at each pole, from which points the scale-pans are suspended, it is obvious that if the magnetic, electric, or electro-magnetic force to be weighed is also positioned (relatively to this point of leverage or center of attraction of such beam) as to bring its center of attraction or point of leverage of forces in coincidence with that of the scale-beam, absolutely true results must ensue. For this reason I arrange the standard G so that the axis of the spool K will lie in the plane of the point of leverage of the magnetic forces of the scale-beam, said axis being the corresponding point of leverage of the electric forces in the wire on the spool. The weighing of magnetic, electric, or electro-magnetic forces other than terrestrial may also take place at the north pole of the scale-beam, the poles of the spool being reversed—that is to say, the north pole will be up and the south pole down.

The supports for the spool K, as well as all the parts of the scales, are constructed of brass, except the scale-beam, its knife-edges $f$, and the bearing-plates $b^i$ for said knife-edges, which are constructed of steel. In practice, I prefer, however, to construct the knife-edges and their bearings of agate or other similar stone.

The knife-edges, as shown, are clamped between brass clamping-plates $f^i$.

Having described my invention, what I claim is—

1. In a scale for weighing magnetic, electric, or electro-magnetic forces, a magnetized or polarized scale-beam, substantially as and for the purposes specified.

2. In a scale for weighing magnetic, electric, or electro-magnetic forces, a magnetized or polarized beam neutralized as against terrestrial magnetism, substantially as and for the purposes specified.

3. In a scale for weighing magnetic, electric, or electro-magnetic forces, the combination, with a magnetized or polarized scale-beam, of a coil of insulated wire included in an electric circuit and supported in proximity to one of the poles of the beam, substantially as and for the purposes specified.

4. In a scale for weighing magnetic, electric, or electro-magnetic forces, the combination, with a magnetized or polarized scale-beam, of a coil of insulated wire included in an electric circuit and supported in proximity to one of the poles of the beam in the plane of the center of attraction or point of leverage of the forces, substantially as and for the purposes specified.

5. In a scale for weighing magnetic, electric, or electro-magnetic forces, the combination, with a magnetized or polarized scale-beam, of a coil of insulated wire included in an electric circuit and supported in proximity to one of the poles of the beam and adjustable relatively to said beam.

6. In a scale for weighing magnetic, electric, or electro-magnetic forces, the combination, with a magnetized or polarized scale-beam, of a coil of insulated wire included in an electric circuit and supported in proximity to one of the poles of the beam in the plane of the center of attraction or point of leverage of the forces and adjustable relatively to said center or point, substantially as and for the purposes specified.

7. In a scale for weighing magnetic, electric, or electro-magnetic forces, the combination, with a magnetized or polarized scale-beam neutralized as against terrestrial magnetism, of a coil of insulated wire included in an electric circuit and supported in proximity to one of the poles of the beam, substantially as and for the purposes specified.

8. In a scale for weighing magnetic, electric, or electro-magnetic forces, the combination, with a magnetized or polarized scale-beam neutralized as against terrestrial magnetism, of a coil of insulated wire included in an electric circuit and supported in close proximity to one of the poles of the beam in the plane of the center of attraction or point of leverage of the forces and adjustable relatively thereto, substantially as and for the purposes specified.

9. In a scale for weighing magnetic, electric, or electro-magnetic forces, a magnetized or polarized scale-beam and a scale-pan suspended from said scale-beam at the center of attraction or point of leverage of the forces, substantially as and for the purposes specified.

10. In a scale for weighing magnetic, electric, or electro-magnetic forces, the combination, with the scale-beam A and the screw-threaded standard G, carrying the adjusting-nut I, of the spool-holder comprising the rod L, bracket-arm L', and guide-rod and bracket M $m$, substantially as and for the purposes specified.

In testimony whereof I affix my signature in presence of two witnesses.

ADOLPHUS. GIPPERICH.

Witnesses:
JAMES J. SUTTON,
S. McG. FISHER.